United States Patent [19]

Aschberger et al.

[11] Patent Number: 4,921,134
[45] Date of Patent: May 1, 1990

[54] CIRCUIT ARRANGEMENT FOR REGULATING THE FILLING AND REFILLING OF CONTAINERS WITH LIQUIDS

[75] Inventors: Matthias Aschberger; Karlheinz Färber, both of Giengen; Anton Deininger, Bachhagel, all of Fed. Rep. of Germany

[73] Assignees: The Coca-Cola Company, Atlanta, Ga.; Bosch-Siemens Hausgerate GmbH, Fed. Rep. of Germany

[21] Appl. No.: 768,362

[22] Filed: Aug. 22, 1985

[30] Foreign Application Priority Data

Aug. 22, 1984 [DE] Fed. Rep. of Germany ....... 3430934

[51] Int. Cl.$^5$ .............................................. B67D 5/08
[52] U.S. Cl. ...................................... 222/64; 222/638; 137/392
[58] Field of Search ................. 222/64, 63, 52, 124 R, 222/638, 129, 640, 641, 67, 129.1; 261/DIG. 7, 66; 137/492, 412, 392, 386, 392; 141/198, 95

[56] References Cited

U.S. PATENT DOCUMENTS

| | | | |
|---|---|---|---|
| 2,667,341 | 10/1953 | Covert et al. | 137/492 |
| 2,867,354 | 1/1959 | Tanzda et al. | 222/64 |
| 3,155,048 | 11/1964 | Mandelbaum et al. | 137/392 |
| 3,632,019 | 1/1972 | Harm | 141/198 |
| 3,876,107 | 4/1975 | Meindl et al. | 222/64 |
| 3,891,123 | 6/1975 | Blackburn | 222/64 |
| 4,095,920 | 6/1978 | Needham et al. | 137/392 |
| 4,140,245 | 2/1979 | Castillo | 222/64 |
| 4,148,334 | 4/1979 | Richards | 222/129.1 |
| 4,259,982 | 4/1981 | Bartels | 137/392 |
| 4,360,128 | 11/1982 | Neumann | 222/64 |
| 4,445,238 | 5/1984 | Maxhimer | 137/392 |
| 4,498,146 | 1/1986 | Sueds | 137/392 |
| 4,518,541 | 5/1985 | Harris | 261/DIG. 7 |
| 4,601,409 | 7/1986 | Di Regolo | 222/67 |

Primary Examiner—Joseph J. Rolla
Assistant Examiner—Kenneth Noland
Attorney, Agent, or Firm—Birch, Stewart, Kolasch & Birch

[57] ABSTRACT

A circuit configuration for regulating the filling and refilling of containers with liquids, such as a carbonator vessel, and comprises a liquid container and an electronic circuit for reading the liquid level in the container at a single level and generating a level signal corresponding to the liquid level sensed, and in the event the level falls below a predetermined level, causes a flow regulator controlled by a timer to provide a refilling with an overshoot so as to permit the liquid level to rise to a second predetermined level above the first predetermined level so that the volume of the head space and pressure within the container is held substantially constant.

10 Claims, 1 Drawing Sheet

CIRCUIT ARRANGEMENT FOR REGULATING THE FILLING AND REFILLING OF CONTAINERS WITH LIQUIDS

BACKGROUND OF THE INVENTION

The invention relates to a circuit arrangement for the filling or refilling, as required, of a storage tank with liquid, such as water, and more particularly for filling a carbonating tank in a beverage dispenser, wherein carbonated liquid is withdrawn in measured quantities from the storage tank during a dispensing mode and wherein replenishment is controlled by an electronic circuit including a flow-rate control unit which is responsive to water-requirement level values as provided by an electronic sensor.

It is common practice, for example to produce blended beverages, shortly before consumption, by using a variable mixture consisting of soda water and beverage concentrates. To prepare this soda water, a storage tank, preferably chilled, is employed in a manner known to those skilled in the art and quantities of soda water are withdrawn, as required, from the storage tank to prepare the blended beverages. The ingredients for the soda water, i.e., $CO_2$ gas and fresh water, are periodically supplied to the storage tank according to the amount of soda water withdrawn. To supply $CO_2$ gas to the storage tank, a $CO_2$ supply cylinder is connected thereto via a pressure-reducing valve. To fill and refill the storage tank with fresh water, the tank is connected to a water supply line. This water supply line is connected to a common water supply source or the water can be delivered from a water tank. A flow input regulator controls the water intake required in each case according to the soda water level in the storage tank. The soda water level is read by sensors which, in the interest of a simple design and simple signal processing, comprises a series-connected measuring circuit. If an adequate water pressure is present in the supply line, the input regulator for the fresh water is simply constructed by using an electrically triggered valve system. However, if one cannot assume with certainty that a sufficient water presssure will always be available in the supply line, it is often necessary to provide a pump unit in conjunction with an appropriate valve system. The water supply pressure must be sufficiently high, because the water—at least during the filling of the storage tank—must be supplied against the high pressure of the $CO_2$ gas.

Functional units, such as triggerable valves as well as pump units, are to a large extent subject to extremely high loads during turn-on or turn-off. Especially if these operating cycles are up against relatively short delivery or dead times, these functional parts are subject to considerable wear. Also unnecessary and disturbing operating cycles of the flow-rate control units can result, particularly in connection with the refilling, because the surface of the soda water is also moved up and down in the area of the water-level sensor.

The primary object of the invention, therefore, is to reduce the switching frequency for the flow-rate control unit by extending the filling time period by a predetermined amount to permit the liquid level to rise above a predetermined level so that the volume of the gaseous head space and pressure within a carbonator tank is maintained substantially constant. It might be possible to use water-level sensors that act upon sensitive switches. This would enable the attainment of the desired overlap. However, such systems are expensive to produce. In addition, special care must be exercised with respect to their operability, and the various moving parts must be continuously monitored so as to insure that they are fully operable. Thus, in the case of the system advocated by the invention, one need not rely on such techniques. Rather, a circuit arrangement is disclosed that senses the water-requirement level value by a single electrode and generate a water demand signal when the level falls below a first predetermined level that energizes supply means, controlled by timer means, that permits the water to rise to a second predetermined level above the first predetermined level resulting in substantial reduction, if not elimination, in refill short cycling of the equipment as well as maintaining the above mentioned substantially constant gaseous head space and pressure within the carbonator tank.

SUMMARY

According to the teachings of the invention, a circuit arrangement is provided that satisfies these requirements and is characterized by the fact that in the controlled system between the electronic liquid sensor and the flow-rate control unit there is located a timing unit for triggering the flow-rate control unit by which the latter is triggered briefly beyond the time interval for the liquid supply due to the presence of a certain liquid replenishment need. The timing control unit (ZS) triggers valve 9 and pump 10 for controlling the volume of liquid displaced in order to supply liquid due to the presence of the liquid-requirement criterion. Thereafter (ZS) briefly triggers valve 9 and pump 10 beyond the time interval for the fill requirement criterion. Accordingly, the triggering beyond the time interval for the liquid supply criterion is a further control signal.

In a circuit arrangement incorporating the features of the invention, only electronic switching techniques are used. The sensor includes a single measuring electrode that dips into the liquid supply and forms, across the liquid and in conjunction with another electrode comprising the metallic housing wall performing an electrically variable resistance measuring element providing an analog output signal level, and wherein the threshold can be converted into a digital signal by generating an electronic difference signal by means of a differential amplifier. The timing unit is likewise constructed simple electronic means of known construction. Depending on the capacity of the storage tank, variously adjustable times for the overshoot may be expedient. With a volumetric capacity of about 2 liters, for example, an overshoot of about 2 seconds has proved to be useful. Further steps are not required for solving the problem posed by the invention.

BRIEF DESCRIPTION OF THE DRAWING

A specific embodiment incorporating the invention will now be described in detail with reference to the accompanying drawing, in which.

DETAILED DESCRIPTION OF THE PREFERRED EMBODIMENT

Figure 1:
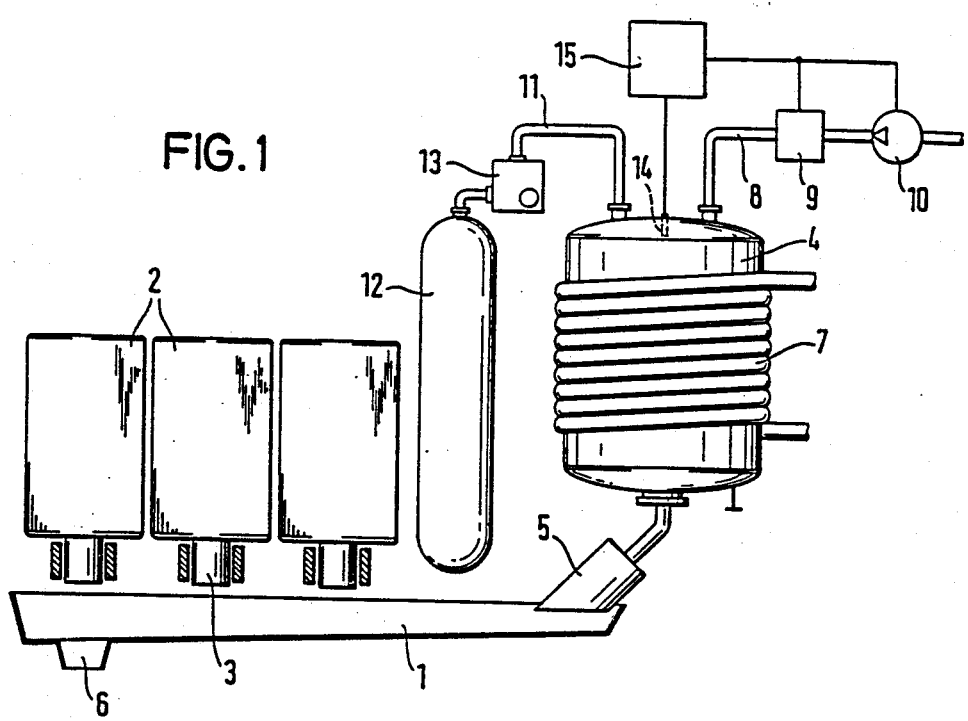
FIG. 1 is a schematic diagram of a beverage mixer.

Referring now to FIG. 1, a beverage dispenser for mixing various beverage concentrates with cooled $CO_2$ water to produce a blended beverage comprises as main components, a mixing trough 1 in which the mixing process is initiated or carried out, a beverage-concentrate container 2 from which the beverage concentrates are supplied in portions to the mixing trough 1 via metering units 3, and a storage tank 4 for cooled $CO_2$ water which can flow into the mixing trough, as needed, via a dispensing valve 5. The beverage mixtre issues from the mixing trough 1 through a discharge funnel 6.

The $CO_2$ water supply is cooled by refrigerants which are passed through a coiled conduit 7 wound around the storage tank 4. The $CO_2$ water supply in the tank 4 is replenished by the quantities withdrawn via the dispensing valve 5 by feeding fresh water through a conduit 8 connected to a controlled valve 9 and a pump 10 while the $CO_2$ gas is supplied through a conduit 11 from a container 12 filled with $CO_2$ gas and controlled by a valve 13. The pump 10 is necessary because the input water supply has to overcome the high internal pressure in the tank 4 due to the influence of by the $CO_2$ gas. The water level in the storage tank 4 is measured by a sensor 14 designed as an electrode. A variable resistance element is provided by the ratio of contact of this sensor 14 with the soda water in conjunction with the metal housing wall of the storage tank 4.

Figure 2:
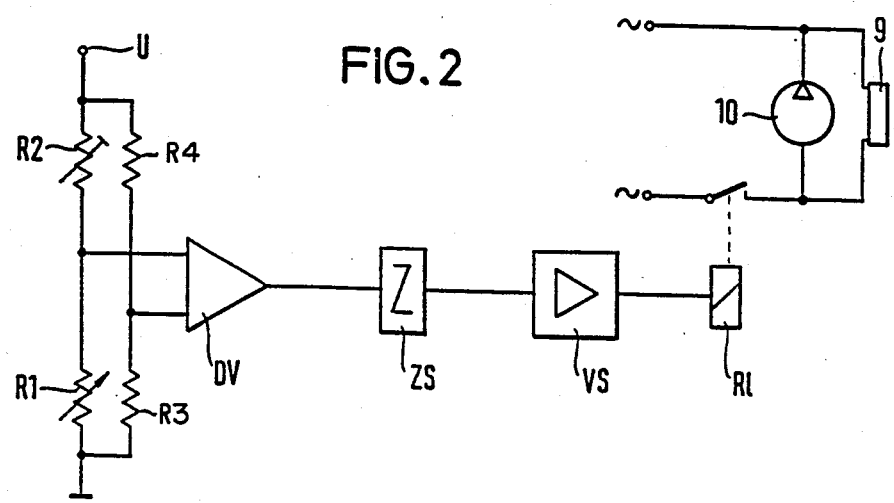
FIG. 2 shows a circuit arrangement for triggering the water supply control unit.

This variable resistance element is denoted in the circuit arrangement depicted in FIG. 2 as a variable resistor R1. The value of variable resistance representing the particular level of the soda water in the storage tank 4 is determined in a control circuit 15 (FIG. 1) which is used to trigger the valve 9 and control the pump 10. The essential functional parts of the control circuit 15 are detailed in FIG. 2 and are integrated in a microprocessor.

Referring now to FIG. 2 a variable level set resistor R2 is additionally provided for threshold adjustment purposes. The resistance valve R1 representing the level measuring element in conjunction with R2 forms a voltage divider whose center tap is connected to the input of a differential amplifier DV. A reference value for the differential amplifier DV is supplied by a second voltage divider consisting of two resistors R3 and R4 coupled across a voltage source U. If a signal corresponding to a first water-requirement level value is delivered by means of the differential amplifier DV, the valve 9 and the pump 10 are activated by a timing unit ZS and an amplifier circuit VS via a relay RL, resulting in the supply of fresh water through the pipe 8 to the storage tank 4. If the resistance value R1 represents a first predetermined water level in the tank 4, a demand water-requirement level value is fed to the timing unit ZS. The latter enables the valve 9 and the pump 10 to remain active for a brief overshoot or extended operational period to increase the level of the water supply in the storage tank to a second predetermined level. This substantially reduces, if not eliminates, short cycling and thus maintains the volume of the gaseous head space and pressure within the storage tank substantially constant.

After disconnecting these water-supplying devices, the water level in the storage has reached a level that lies sufficiently above the measuring level read by the measuring electrode 14 and established by the threshold set at the differential amplifier DV.

We claim:

1. A system for supplying water to a carbonator tank, said carbonator tank in operation having a gaseous head space of a variable volume above the level of water in said tank, comprising:

(a) single liquid level sensor means for sensing when the level of water falls below a first predetermined level and generating a water demand signal;
   (b) supply means energized by said water demand signal for supplying water to said carbonator tank;
   (c) control circuit means enabled by said water demand signal for generating control signals which maintain said supply means energized while said liquid level sensor means are generating said water demand signal to permit the water level in the tank to rise to said first predetermined level; and
   (d) timer means included in said control circuit means for generating a further control signal subsequent to the end of said water demand signal, whereby said further control signal maintains said supply means energized for a period of time sufficient to permit the water level in the tank to rise to a second predetermined level above said first predetermined level;

whereby said period to time is selected so that short cycling is substantially eliminated and the volume of said head space and pressure within said tank is maintained substantially constant.

2. A circuit configuration according to claim 1, wherein said timer means is integrated within a microprocessor circuit.

3. A circuit configuration according to claim 1 wherein said tank is comprised of electrically conductive material and wherein said liquid sensor means comprises a variable resistance including an electrode, adapted to contact the liquid in said tank, and the electrically conductive material of said tank.

4. A system for supplying water to a carbonator tank, said carbonator tank in operation having a gaseous head space of a variable volume above the level of water in said tank, comprising:

single liquid level sensor means for sensing when the level of water falls below a first predetermined level and generating a water demand signal;
   supply means energized by said water demand signal for supplying water to said carbonator tank;
   control circuit means including timer means enabled by said water demand signal for generating control signals which maintain said supply means energized for a period of time sufficient to permit the water level in the tank to rise to a second predetermined level above said first predetermined level;
   whereby said period of time is selected so that short cycling is substantially eliminated and the volume of said head space and pressure within said tank is maintained substantially constant;
   said tank is comprised of electrically conductive material and said liquid sensor means comprises a variable resistance including an electrode, adapted to contact the liquid in said tank, and the electrically conductive material of said tank; and
   said control circuit means additionally includes a level setting variable resistance connected in series with said liquid sensor variable resistance, said series connected variable resistances being further coupled across a source of voltage and forming a voltage divider thereby, said voltage divider having a voltage tap providing a water level signal.

5. A circuit configuration according to claim 4 wherein said control circuit means additionally includes difference circuit means including a pair of signal inputs, one of said inputs being coupled to said water level signal and the other of said inputs being coupled to a reference voltage, said difference circuit means being operable to generate said water level demand signal when said water level signal exceeds said reference voltage.

6. A circuit configuration according to claim 5 wherein said difference circuit means comprises a differential amplifier.

7. A circuit configuration according to claim 5 and additionally including another voltage divider coupled across a souce of voltage and also having a voltage tap providing a signal corresponding to said reference voltage.

8. A circuit configuration according to claim 5 wherein said control circuit means additionally includes relay circuit means coupl4ed to and responsive to said water demand signal from said differential amplifier and including at least one set of relay contacts for activating and deactivating said supply means.

9. A circuit configuration according to claim 8 wherein said supply means includes a valve coupled to a water supply.

10. A circuit configuration according to claim 8 wherein said supply means includes a pump coupled to a water supply.

* * * * *